United States Patent
Phogat et al.

(10) Patent No.: US 11,631,220 B2
(45) Date of Patent: Apr. 18, 2023

(54) DIGITAL OBJECT SURFACE INFLATION

(71) Applicant: Adobe Inc., San Jose, CA (US)

(72) Inventors: Ankit Phogat, Noida (IN); Vineet Batra, Pitam Pura (IN); Sumit Dhingra, Krishna Nagar (IN); Qingnan Zhou, Forest Hills, NY (US)

(73) Assignee: Adobe Inc., San Jose, CA (US)

( * ) Notice: Subject to any disclaimer, the term of this patent is extended or adjusted under 35 U.S.C. 154(b) by 31 days.

(21) Appl. No.: 17/203,066

(22) Filed: Mar. 16, 2021

(65) Prior Publication Data
US 2022/0301263 A1    Sep. 22, 2022

(51) Int. Cl.
*G06T 17/20* (2006.01)
*G06T 15/20* (2011.01)

(52) U.S. Cl.
CPC .......... *G06T 17/205* (2013.01); *G06T 15/205* (2013.01); *G06T 2200/24* (2013.01)

(58) Field of Classification Search
CPC . G06T 17/205; G06T 15/205; G06T 2200/24; G06T 17/10
See application file for complete search history.

(56) References Cited

U.S. PATENT DOCUMENTS

| | | | | |
|---|---|---|---|---|
| 10,410,317 B1* | 9/2019 | Phogat | ............... | G06T 3/0068 |
| 2009/0231337 A1* | 9/2009 | Carr | ............... | G06T 17/10 |
| | | | | 345/423 |
| 2013/0120383 A1* | 5/2013 | Joshi | ............... | G06T 19/20 |
| | | | | 345/423 |
| 2013/0127856 A1* | 5/2013 | Winnemoeller | ....... | G06T 17/20 |
| | | | | 345/423 |
| 2019/0087980 A1* | 3/2019 | Phogat | ............... | G06T 11/203 |
| 2019/0206100 A1* | 7/2019 | Batra | ............... | G06T 11/60 |
| 2020/0005537 A1* | 1/2020 | Inagaki | ............... | G06T 19/20 |

OTHER PUBLICATIONS

Andrews, James et al., "A Linear Variational System for Modeling From Curves", Computer Graphics Forum, vol. 30, Issue 6 [retrieved Jan. 8, 2021]. Retrieved from the Internet <http://www.jimmylands.com/mypapers/AJC_CGF2011.pdf>., Jun. 1, 2011, 11 pages.

Baran, Ilya et al., "Notes on Inflating Curves", Retrieved Jan. 8, 2021. Retrieved from the Internet <http://alecjacobson.com/weblog/media/notes-on-inflating-curves-2009-baran.pdf>., 2009, 4 pages.

Joshi, Pushkar et al., "Repousse: Automatic Inflation of 2D Artwork", Eurographics Workshop on Sketch-Based Interfaces and Modeling [retrieved Jan. 8, 2021]. Retrieved from the Internet <https://diglib.eg.org/xmlui/bitstream/handle/10.2312/SBM.SBM08.049-055/049-055.pdf?sequence=1>., Jun. 2008, 7 pages.

* cited by examiner

*Primary Examiner* — Michael Le
(74) *Attorney, Agent, or Firm* — FIG. 1 Patents (57) ABSTRACT

Digital object surface inflation techniques are described as implemented by an image processing system to generate an inflated digital object, automatically and without user intervention, from a two-dimensional digital object in a digital image. In one example, the geometry inflation system generates the inflated digital object based on an outer boundary and in this way overcomes challenges of conventional skeleton based techniques. In another example, rules are configured to guide a geometry inflation system to generate the inflated digital object.

20 Claims, 9 Drawing Sheets

DIGITAL OBJECT SURFACE INFLATION

BACKGROUND

Digital image processing systems are configured to support a wide variety of functionality to create and edit digital images and digital objects within the digital images. Examples of this functionality include techniques to increase realism of two-dimensional digital objects to have a three-dimensional appearance. Conventional techniques to do so, however, typically rely on manual interaction by a content creator with constructs implemented by the digital image processing systems such as gradients and other forms of shading to give this appearance.

Even though these conventional techniques are successful when performed by sophisticated content creators in achieving a realistic appearance, the underlying semantic representation of the digital object is still two dimensional and thus separate from the edits that are made to give this appearance. Therefore, convention techniques require the content creators to manually repeat this process for any changes made to the underlying digital object. This results in inefficient consumption of computational resources used to support these techniques as well as inefficiencies in user interaction with corresponding digital image processing systems necessitated by edits being made to both the digital object and manually applied effects to the object.

SUMMARY

Digital object surface inflation techniques are described as implemented by a geometry inflation system to generate an inflated digital object, automatically and without user intervention, from a two-dimensional digital object in a digital image. In one example, the geometry inflation system generates the inflated digital object based on an outer boundary and in this way overcomes challenges of conventional skeleton based techniques.

In another example, rules are configured to guide the geometry inflation system to generate the inflated digital object to have a realistic appearance. Rule examples include a smoothing rule indicating that heights of the surface support a continuous curvature (e.g., $C^2$ smooth) within the mesh forming the inflated digital object. A zero-at-boundary rule indicates that heights along an outer boundary of a surface of the inflated digital object are zero, which serves to anchor the inflated digital object to a geometry of the underlying digital image. An orthogonal-at-boundary rule indicates a surface of the inflated digital object is orthogonal at an outer boundary of the digital object in relation to a plane defined by the digital object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Digital content creation systems support a multitude of functionality to create and edit digital objects contained within the digital images, e.g., raster objects, vector objects, and so on. However, content creators are often confronted with a choice in how to make the digital content appear realistic. For example, techniques used to form two-dimensional digital objects are often simpler to implement by a computing device and interact with by a content creator as opposed to three-dimensional digital objects due to different amounts of underlying complexity used to implement the objects.

However, conventional techniques used to improve realism of the digital objects (e.g., to give an appearance of depth) are implemented separate from a semantic representation of the digital object itself. Therefore, changes made to the underlying digital object involve manual repetition of edits used to give the appearance of depth. Additionally, these conventional techniques require signification amounts of user interaction to implement and therefore are costly both in the consumption of computational resources as well as costly regarding amounts of user interaction involved with the systems to achieve desired results.

Although subsequent techniques have been developed to assist in promoting realism for a two-dimensional digital object, these techniques introduce additional challenges and often fail as a result. For example, beveling and extraction techniques are generally limited to creation of flat and edged surfaces. Other conventional techniques rely on creation of a skeleton for the digital object, which is then used create a three-dimensional surface. The skeleton, however, is a representation of an interior of the digital object, i.e., as a midpoint between opposing edges of the object. In practice, this often results in a numerically unstable geometry that causes visual artifacts including small protrusions, circles, lack of uniformity, self-intersection, and so on. These visual artifacts are exacerbated when used as a basis to then generate a three-dimensional surface from the skeleton. As a result, these conventional techniques often fail in their intended purpose to promote realism and result in inefficient use of computational resources involving repeated computations and manual interactions necessitated to correct these visual artifacts.

Accordingly, digital object surface inflation techniques are described as implemented by an image processing system to generate an inflated digital object, automatically and without user intervention, from a two-dimensional digital object in a digital image. The inflated digital object has a surface defined in three dimensions with increased realism. The image processing system, for instance, receives a user input initiating generation of an inflated digital object from a two-dimensional digital object. The two-dimensional digital object is configurable in a variety of ways, examples of which include vector objects or other mathematically defined visual objects, raster objects, and so on that are capable of being rendered in a user interface.

In response, a geometry inflation system is employed to generate the inflated digital object, automatically and without further user intervention. The inflated digital object is defined in three dimensions using a plurality of points (e.g., vertices) defining a mesh. A plurality of heights is defined, respectively, for the plurality of points by the geometry inflation system using at least one rule. The rule is configured to guide the geometry inflation system to generate the inflated digital object to have a realistic appearance as part of efficient use of computer resources and thus also supports real time output, e.g., responsive to changes made to the underlying two-dimensional digital object and/or inflation parameters. Examples of the rule include a smoothing rule indicating that heights of the surface support a continuous curvature (e.g., $C^2$ smooth) within the mesh forming the inflated digital object. A zero-at-boundary rule indicates that heights along an outer boundary of a surface of the inflated digital object are zero, which serves to anchor the inflated digital object to a geometry of the underlying digital image. An orthogonal-at-boundary rule indicates a surface of the inflated digital object is orthogonal at an outer boundary of the digital object in relation to a plane defined by the digital object. Other rules are also contemplated.

In one example, the geometry inflation system receives a two-dimensional digital object that is to be inflated. In response, the geometry inflation system generates an outer boundary of the two-dimensional digital object. In an example in which the two-dimensional digital object is a vector object, a Bezier curve of the object is separated into line segments. When configured as a raster object (i.e., a bitmap), boundary detection techniques are employed, e.g., using a trained neural network as part of machine learning. Thus, in this example an outer boundary is employed by the geometry inflation system, as opposed to a skeleton as utilized in conventional techniques.

The geometry inflation system then generates a two-dimensional mesh based on the outer boundary using a triangulation technique. A variety of techniques are employable to do so, examples of which include Constrained Delaunay triangulation (CDT), uniform triangulation technique, and so on. Use of uniform triangulation, for instance, is used to discretize the domain defined by the outer boundary using uniformly spaced samples. Biharmonic smoothing is then employed by the geometry inflation system to move vertices towards the outer boundary such that density of the triangles increases based on closeness to the outer boundary.

The mesh, defined in two dimensions, is then processed by the geometry inflation system to generate heights for respective points of the mesh, i.e., the vertices of the mesh. This is performed by solving a Poisson equation for height following a boundary condition addressing the smoothing rule, zero-at-boundary rule, and/or orthogonal-at-boundary rule. In an implementation, this incorporates an inflation parameter (e.g., as a default and/or specified via user input) to set an amount of inflation at respective points in the mesh. As a result, the geometry inflation system outputs an inflated digital object having a surface defined using a three-dimensional mesh, which is then rendered in a user interface. Computations performed by the geometry inflation system have increased efficiency when compared to conventional techniques and are performable in real time as a user input is received, e.g., as changing the two-dimensional digital object, the inflation parameter, and so on. Further discussion of these and other examples is included in the following sections and shown in corresponding figures.

Example Terms

A "digital object" is any object capable of being rendered for display in a user interface of a display device. Examples of digital objects include vector objects, raster objects, and so on.

"$C^2$" is a measure of surface smoothness. Smoothness is measurable by a number of continuous derivatives it has over a domain, and therefor for "$C^2$" the zero, first, and second derivatives are continuous.

"Constrained Delaunay triangulation" (CDT) is a type of triangulation technique that outputs a set of points defining triangles having edges that are nonoverlapping.

"Uniform triangulation" is used to discretize a domain using uniformly spaced samples, e.g., as equilateral triangles.

In "biharmonic smoothing," vertices of a mesh are moved towards an outer boundary such that density of the mesh is greater along an outer boundary than at an interior of the mesh.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

Figure 1:
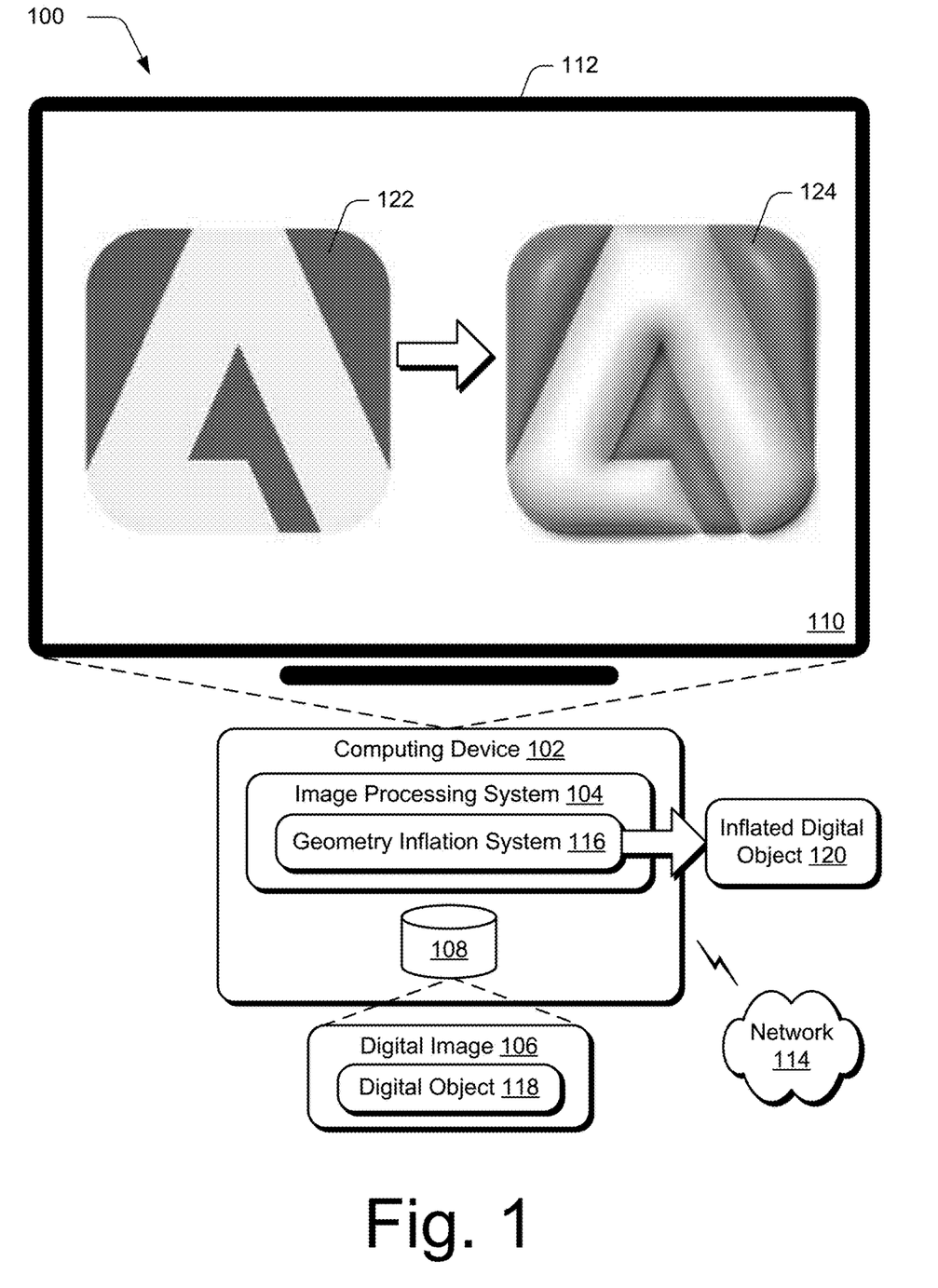
FIG. 1 is an illustration of an environment in an example implementation that is operable to employ digital object surface inflation techniques described herein.

FIG. 1 is an illustration of a digital medium environment 100 in an example implementation that is operable to employ digital object surface inflation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the image 106 is illustrated as a geometry inflation system 116. The geometry inflation system 116 is configured to receive a two-dimensional digital object 118, and from this, generate an inflated digital object 120 having a three-dimensional surface, automatically and without user intervention and in real time. In this way, the geometry inflation system 116 leverages simplicity of techniques usable to create a two-dimensional digital object 118 to then automatically generate the inflated digital object 120 to have a three-dimensional surface.

As depicted in the user interface 110, a digital object example 122 of a logo is created using two-dimensional image creation functionality, e.g., through freeform lines, Bezier curves, and so on. The geometry inflation system 116 is then employed to create an inflated digital object example 124 having a surface defined using three dimensions, which in this instance is used to support an appearance of shadow and light gradients. Thus, the inflated digital object example 124 increases realism of the object and addresses emerging trends in digital content creation, such as a three-dimensional design language for icons. Further, this overcomes the limitations of conventional skeleton-based techniques that cause visual artifacts as further described and shown in relation to FIGS. 8 and 9 below.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Object Surface Inflation

Figure 2:
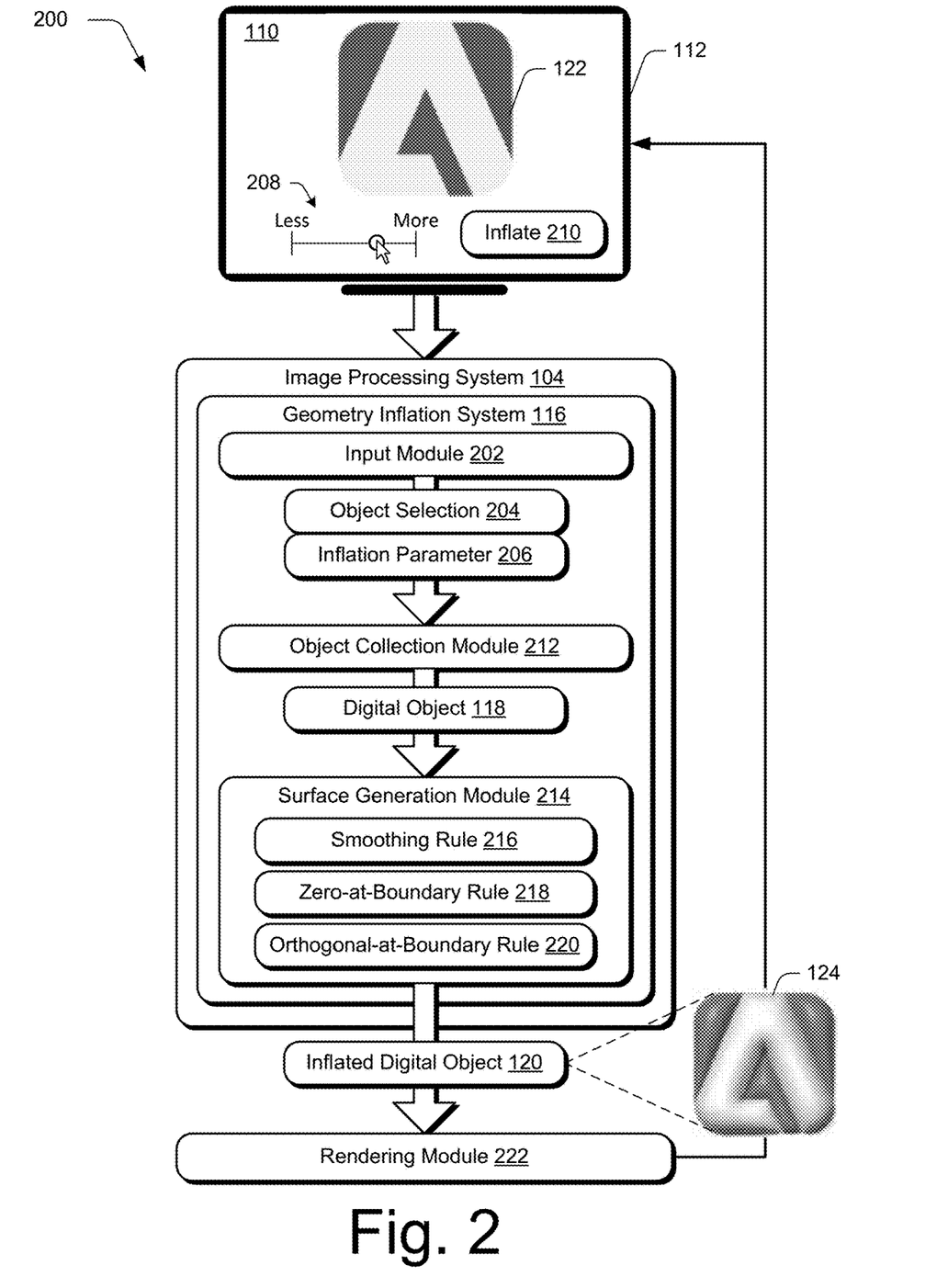
FIG. 2 depicts a system showing operation of a geometry inflation system of FIG. 1 in greater detail as employing rules promoting increased realism.
Figure 3:
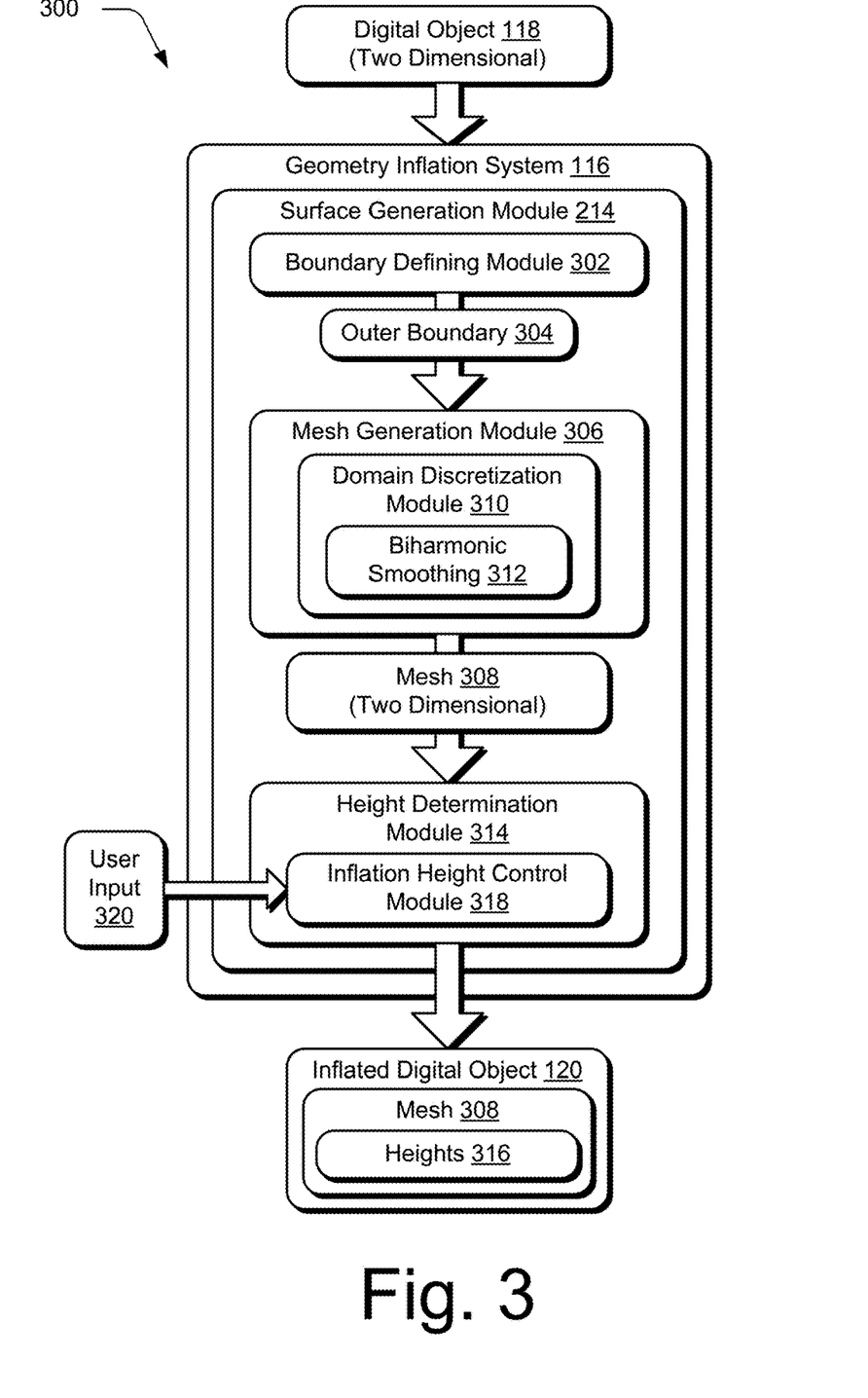
FIG. 3 depicts a system showing operation of a geometry inflation system of FIG. 1 in greater detail as generating an outer boundary that is used as a basis to generate an inflated digital object having a three-dimensional surface.
Figure 4:
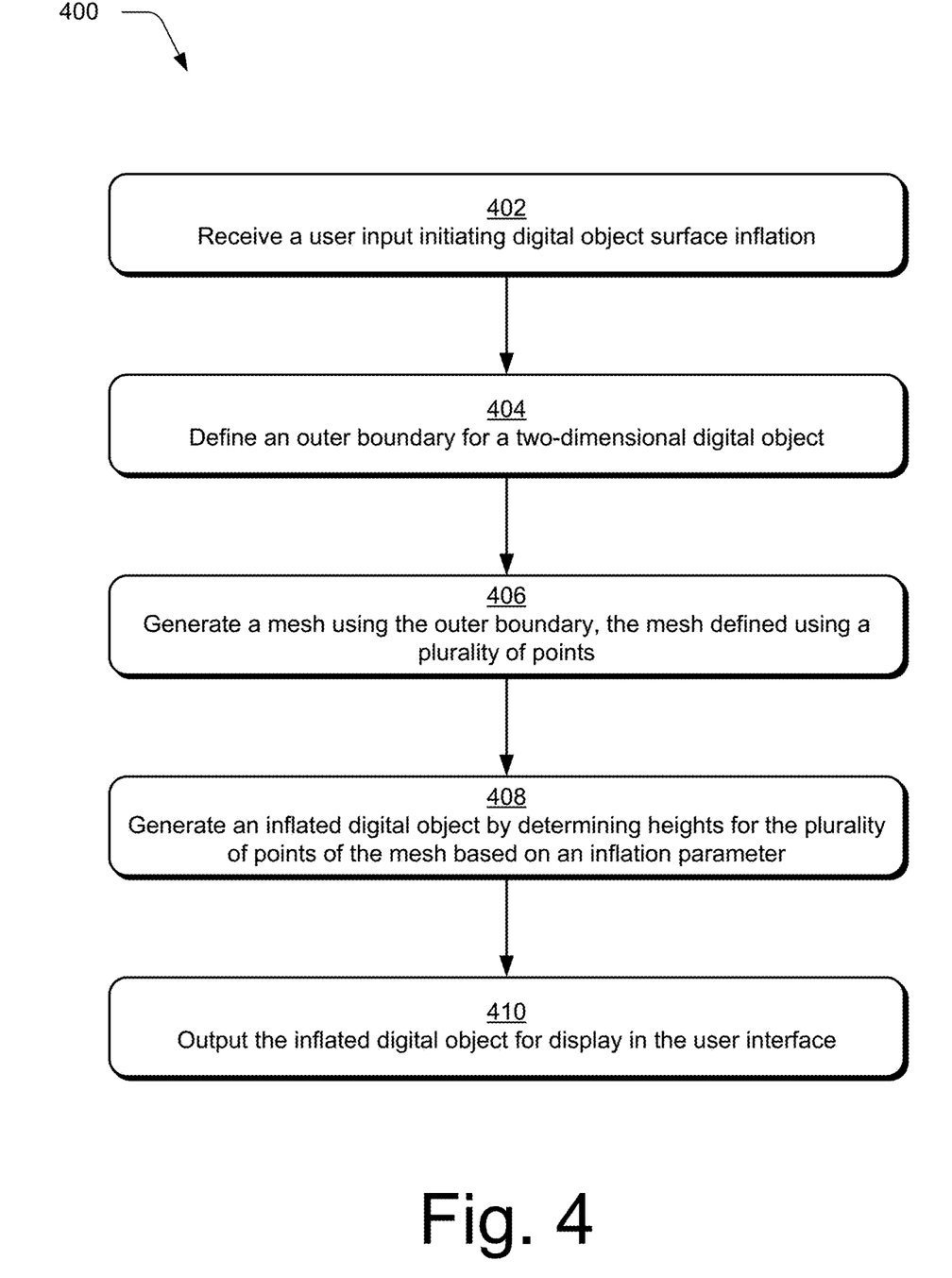
FIG. 4 is a flow diagram depicting a procedure in an example implementation of digital object surface inflation.

FIG. 2 depicts a system 200 showing operation of the geometry inflation system 116 of FIG. 1 in greater detail as employing rules promoting increased realism in generating a three-dimensional surface. FIG. 3 depicts a system 300 showing operation of the geometry inflation system 116 in greater detail as generating an outer boundary that is used as a basis to generate an inflated digital object having a three-dimensional surface. FIG. 4 depicts a procedure 400 in an example implementation of digital object surface inflation.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

To begin in this example, an input module 202 of the geometry inflation system 116 receives a user input initiating digital object surface inflation. As depicted in FIG. 2, a user interface 110 rendered by a display device 112 includes a two-dimensional digital object example 122. An object selection 204 user input is received selecting the digital object example 122, e.g., via a gesture detected by a touchscreen, cursor control device, spoken utterance, and so on. A user input is also received specifying an inflation parameter 206 through interaction with a control 208, e.g., to specify relative amounts of inflation (i.e., heights) to be applied using a slider control as illustrated, numerical amounts, and so forth. The inflation parameter 206, for instance, specifies a value between "0" and "1," with "1" indicating a maximum height. A default value for the inflation parameter 206 is also contemplated, which is then changeable through interaction with the control 208 as further described below. In this example, an option 210 is depicted that is user selectable to initiate generation of the inflated digital object 120. Other examples are also contemplated, such as to generate the inflated digital object 120 automatically based on user interaction with the digital object example 122 rendered in the user interface 110.

Upon receipt of the user input, the geometry inflation system 116 is configured to generate the inflated digital object 120 automatically and without user intervention (in real time) for output in the user interface 110. As part of this, an object collection module 212 is employed to obtain the two-dimensional digital object 118 based on the object selection 204. The two-dimensional digital object 118 is configurable in a variety of ways, examples of which include vector objects, raster objects, and any other object format capable of being rendered in a user interface 110.

The two-dimensional digital object 118 is then passed by the object collection module 212 as an input to a surface generation module 214. The surface generation module 214 is configured to generate the inflated digital object 120 to have a three-dimensional surface based on the inflation parameter 206. To do so, the surface generation module 214 employs rules that constrain generation of the surface in a manner that promotes a realistic appearance of the inflated digital object 120.

The surface generation module 214, for instance, generates a two-dimensional mesh "$\Omega$" as a simply-connected domain in "$\mathbb{R}^2$" with a piece-wise smooth outer boundary denoted as "$\partial\Omega$," i.e., a boundary of the domain. A three-dimensional surface inflated from the two-dimensional mesh "$\Omega$" is modeled using a height-field function:

$$z(x,y):\Omega \mapsto \mathbb{R}$$

Rules that are employed to promote realism in the results include a smoothing rule 216 indicating that heights of the height field "z(x, y)" for a plurality of points define a surface having continuous curvature ($C^2$) for all:

$$(x,y) \in \Omega$$

Smoothness of a function is measurable by a number of continuous derivatives it has over a domain, and therefor for "$C^2$" the zero, first, and second derivatives are continuous. In this example, continuous curvature is used such that the surface does not include sharp corners.

In another example, a zero-at-boundary rule 218 indicates heights for the plurality of points at an outer boundary of the inflated digital object 120 are zero. Thus, the height field:

$$z(x,y)=0$$

for:

$$(x,y) \in \partial\Omega$$

As a result, the zero-at-boundary rule sets heights of the inflated digital object 120 at zero along the outer boundary of the object. This anchors the inflated digital object 120 to a two-dimensional geometry of the digital image 106.

In a further example, an orthogonal-at-boundary rule 220 indicates a three-dimensional surface of the inflated digital object 120 is orthogonal at an outer boundary of the object in relation to a plane defined by the digital image 106, e.g., using "X/Y" coordinates. Therefore, the gradient:

$$\|\nabla z(x,y)\| = \infty$$

for:

$$(x,y) \in \partial\Omega$$

This implies the surface of the inflated digital object 120 is orthogonal with the "X/Y" plane at an outer boundary of the inflated digital object 120.

As an example, assume a domain of the two-dimensional mesh "$\Omega$" is defined as a circular disc of radius "R" centered as the origin of "$\mathbb{R}^2$". A hemisphere:

$$z(x,y) = \sqrt{R^2 - x^2 - y^2},$$

satisfies each of the rules above, e.g., a smoothing rule 216, a zero-at-boundary rule 218, and orthogonal-at-boundary rule 220.

The inflated digital object 120 is then output to a rendering module 222 for rendering in a user interface 110 displayed by the display device 112. The inflated digital object example 124, for instance, is depicted as having a shadow and light-gradient effect applied based on a three-dimensional surface defined by the inflated digital object 120. In this way, the geometry inflation system 116 promotes realism of the two-dimensional digital object 118 automatically and without user intervention and further overcomes the challenges of conventional techniques as further described below.

FIG. 3 depicts an example implementation of a system 300 showing operation of the surface generation module 214 in greater detail. The surface generation module 214 in this example generates the inflated digital object 120 based on an outer boundary of the two-dimensional digital object 118, as opposed to a skeleton.

As previously described, some conventional techniques of creating a three-dimensional geometry from a two-dimensional object are based on a skeleton that is generated for the digital object, which is then used create a three-dimensional surface. The skeleton, however, is a representation of an interior of the digital object, i.e., as a midpoint between corresponding edges of the object. This often results in a numerically unstable geometry that causes visual artifacts including small protrusions, circles, lack of uniformity, self-intersection, and so on as further described in relation to FIGS. 8 and 9 that are exacerbated when used as a basis to then generate a three-dimensional surface from the skeleton. As a result, these conventional techniques often fail in their intended purpose to promote realism and result in inefficient use of computational resources involving repeated computations and manual interactions necessitated to correct these visual artifacts. Accordingly, in the techniques described in this example an outer boundary is generated from the digital object and used as a basis to generate a three-dimensional surface defining the inflated digital object 120.

To begin in this example, the surface generation module 214 receives a digital object 118 responsive to a user input initiating digital object surface inflation (block 402), e.g., through use of the input module 202 of FIG. 2. A boundary defining module 302 of the surface generation module 214 is then employed to define an outer boundary 304 for the two-dimensional digital object (block 404). This is performable in a variety of ways. In an instance in which the two-dimensional digital object 118 is a raster object, edge-detection and/or depth detection techniques are employed to identify the outer boundary 304 defined by pixels of the two-dimensional digital object 118, e.g., using a neural network trained as part of machine learning.

In an instance in which the two-dimensional digital object 118 is a vector object, Bezier curves that define the two-dimensional digital object 118 are broken into line segments (i.e., polylines) by sampling the curves. The sampling is definable based on thresholds involving a length and/or curvature of piecewise Bezier segments in an input spline of the vector object. The line segments form the outer boundary 304 of an input domain of the two-dimensional digital object 118. A variety of other examples are also contemplated that are usable to define the outer boundary 304. The outer boundary 304 of the two-dimensional digital object 118 may include multiple parts, such as to define an inner portion and outer portion of a ring.

The outer boundary 304 is output by the boundary defining module 302 to a mesh generation module 306. The mesh generation module 306 is configured to generate the mesh 308 as defined using a plurality of points (e.g., vertices) based on the outer boundary 304 (block 406). A variety of techniques are usable to generate the mesh 308. In one example, Constrained Delaunay triangulation (CDT) is used which receives as an input the outer boundary 304 and in response outputs a set of points defining triangles having edges that are nonoverlapping. In another example, uniform triangulation is used in which each triangle defined by the points making up the mesh 308 is equilateral.

As part of generating the mesh 308 in this example, a domain discretization module 310 is also employed to implement a discretization technique, an example of which is illustrated as biharmonic smoothing 312. In biharmonic smoothing, vertices of the mesh 308 are moved towards the outer boundary 304 such that density of the mesh 308 is greater along the outer boundary 304 than at an interior of the mesh 308. Thus, discretization of the mesh (i.e., discrete quantities defined by respective triangles) decreases relative to increases in distance from the outer boundary 304 in the mesh 308 and increases based on nearness to the outer boundary 304. In another example, discretization of the mesh increases relative to increases as curvature of a surface of the mesh increases, e.g., such that areas of a surface exhibiting high amounts of curvature have a greater number of triangles than areas that relatively flat. This overcomes potential challenges and improves realism of the resulting inflated digital object 120 as further described in relation to FIG. 7.

As described above, the smoothing rule 216 is employed to define smoothness of a three-dimensional surface of the inflated digital object 120. Thus, the surface of the inflated digital object 120:

$$\{(x,y,z(x,y)):(x,y)\in\Omega\}$$

is "$C^2$" smooth even when the outer boundary 304 "$\partial\Omega$" is smoothed in a piecewise manner. As a result, however, a slope of a height field may become arbitrarily large and lead to undesirable smoothness artifacts near the outer boundary 304.

To counter this, discretization of the domain as implemented by the domain discretization module 310 is denser in regions near the outer boundary 304 where the slope is large. There are multiple ways of achieving this adaptive sampling of the domain, an example of which includes biharmonic smoothing 312.

The mesh generation module 306, for instance, first discretizes the domain using uniformly spaced samples. Following this, the domain discretization module 310 implements biharmonic smoothing 312 for "X" and "Y" coordinates by solving the following equations:

$$\Delta^2 x = 0, \Delta^2 y = 0 \quad (x, y) \in \Omega$$
$$(x, y) \text{ fixed} \quad (x, y) \in \partial\Omega$$

In addition to sample density, another factor that influences perceived smoothness of the discretized surface is normal interpolation. Typical rendering engines (e.g., as implemented by a rendering module 222) compute a normal of a point inside a triangle by linearly interpolating the normals of the three vertices that define the triangle. As a result, shape and size of the triangles has a significant effect on perceived smoothness of the surface of the inflated digital object 120. Accordingly, uniform triangulation is used in an implementation to generate the mesh 308, which is then followed by biharmonic smoothing of the domain such that interior triangles are nearly equilateral with density of the triangles increasing from the interior towards an exterior defined by the outer boundary 304.

Figure 5:
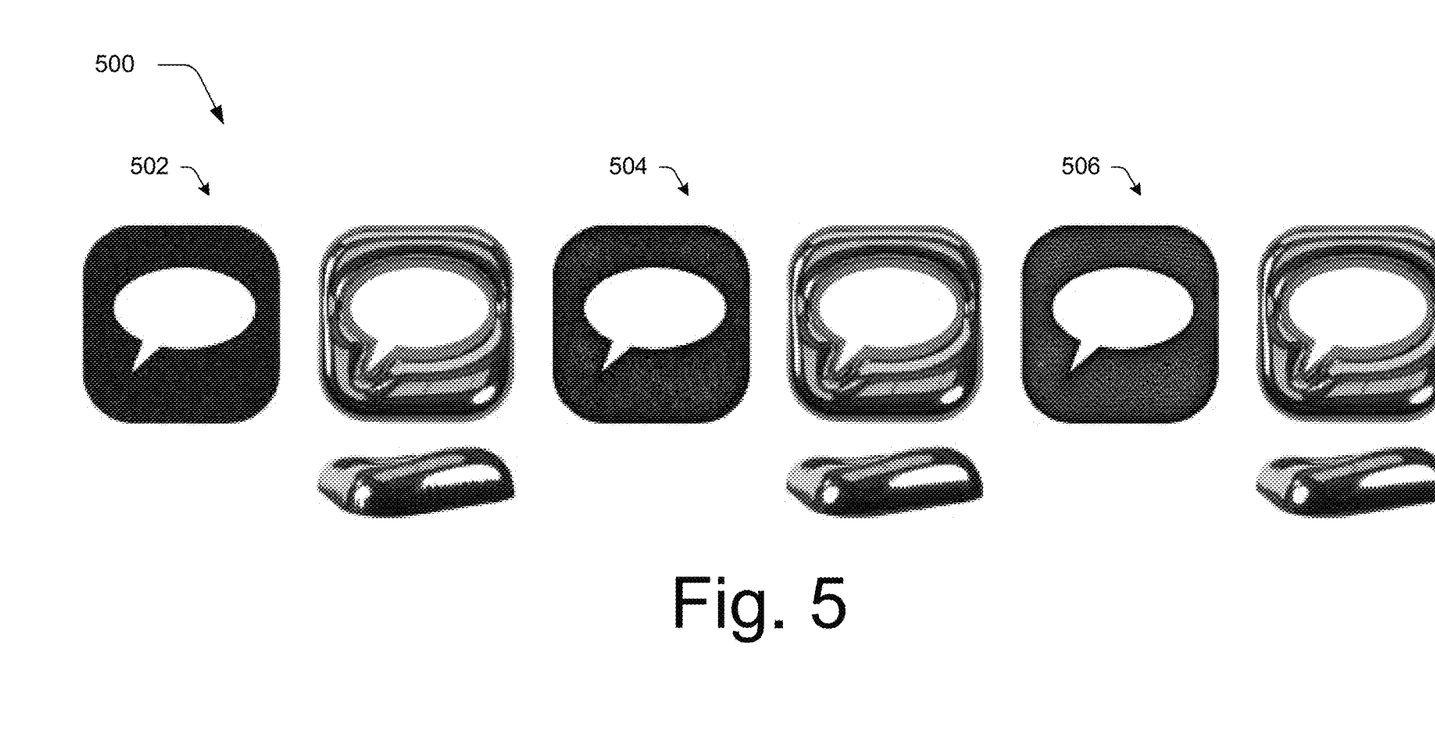
FIG. 5 depicts an example implementation showing effects of discretization on smoothness of a surface of an inflated digital object.

FIG. 5 depicts an example implementation 500 showing effects of discretization on smoothness of a surface of an inflated digital object 120. In a first example 502, Constrained Delaunay triangulation is used without biharmonic smoothing, which leads to smoothness artifacts along interior and exterior outer boundaries of the inflated digital object 120. In a second example 504, Constrained Delaunay triangulation is employed with biharmonic smoothing to move points (i.e., vertices) defining the mesh 308 towards the outer boundary 304, thus alleviating smoothness artifacts near the outer boundary 304. In a third example 506, uniform triangulation is performed followed by biharmonic smoothing which avoids nearly all visible smoothness artifacts.

Returning to FIG. 3, the mesh 308 (which is now configured in two dimensions) is passed as an input to a height determination module 314. The height determination module 314 generates a three-dimensional surface of the inflated digital object 120 by determining heights 316 for the plurality of points defining the mesh based on the inflation parameter 206 (block 408). Thus, heights 316 "Z" are calculated for "X/Y" coordinates of points defining the mesh 308. In an example, let:

$$z(x,y)=\sqrt{h(x,y)}$$

where the function:

$$h(x,y):\Omega \mapsto \mathbb{R}^2$$

satisfies the following equations:

$$\nabla^2 h(x,y)=-4 \quad (x,y)\in\Omega$$

$$h(x,y)=0 \quad (x,y)\in\partial\Omega$$

The value "−4" is chosen as a Laplacian for:

$$h(x,y)=R^2-x^2-y^2$$

i.e., when "z(x, y)" is a height function of a hemisphere. Thus, when the two-dimensional mesh "$\Omega$" is a circular disc, the inflated digital object 120 generated by solving these equations is a hemisphere. As the solution to a Poisson equation "h(x, y)" is "$C^2$" in two-dimensional mesh "$\Omega$," "h(x, y)" is also positive in "$\Omega$" because it has a negative Laplacian in the domain and is zero at the outer boundary. Therefore, "h(x, y)" satisfies the smoothing rule 216 and zero-at-boundary rule 218 by construction.

Moreover, by continuity, "h(x, y)" approaches zero as "(x, y)" approaches the outer boundary, i.e., domain boundary "$\partial\Omega$." Thus, values of:

$$\|\nabla z(x, y)\| = \frac{\|\nabla h(x, y)\|}{2\sqrt{h(x, y)}}$$

approach infinity at the outer boundary 304, thereby satisfying the orthogonal-at-boundary rule 220.

Returning again the FIG. 2, the user interface 110 output by the geometry inflation system 116 includes a control 208 to set the inflation parameter 206. The inflation parameter 206 specifies an amount of inflation to a local feature size of the domain. To support such inflation height control without compromising the techniques described above, an inflation height control module 318 implements the following height field composition formulation responsive to a user input 320.

The inflation parameter 206, for instance, as user specified is represented as:

$$\alpha\in[0,1]$$

where "$\alpha=0$" indicates the three-dimensional surface of the inflated digital object 120 is completely flat and "$\alpha=1$" indicates the three-dimensional surface of the inflated digital object 120 is "fully inflated." A modulated height function "$z_\alpha(x, y)$" is defined as:

$$z_\alpha(x, y) = \frac{4\sqrt{\alpha h_{max}}}{1+2^{-\frac{\pi}{2}}\sqrt{\frac{h(x, y)}{\alpha h_{max}}}}$$

where:

$$h_{max} := \max\{h(x, y):(x, y) \in \Omega\}$$

The modulated height function is a form of function composition of normalized "z(x, y)" and a logistic function parameterized by "$\alpha$."

Figure 6:
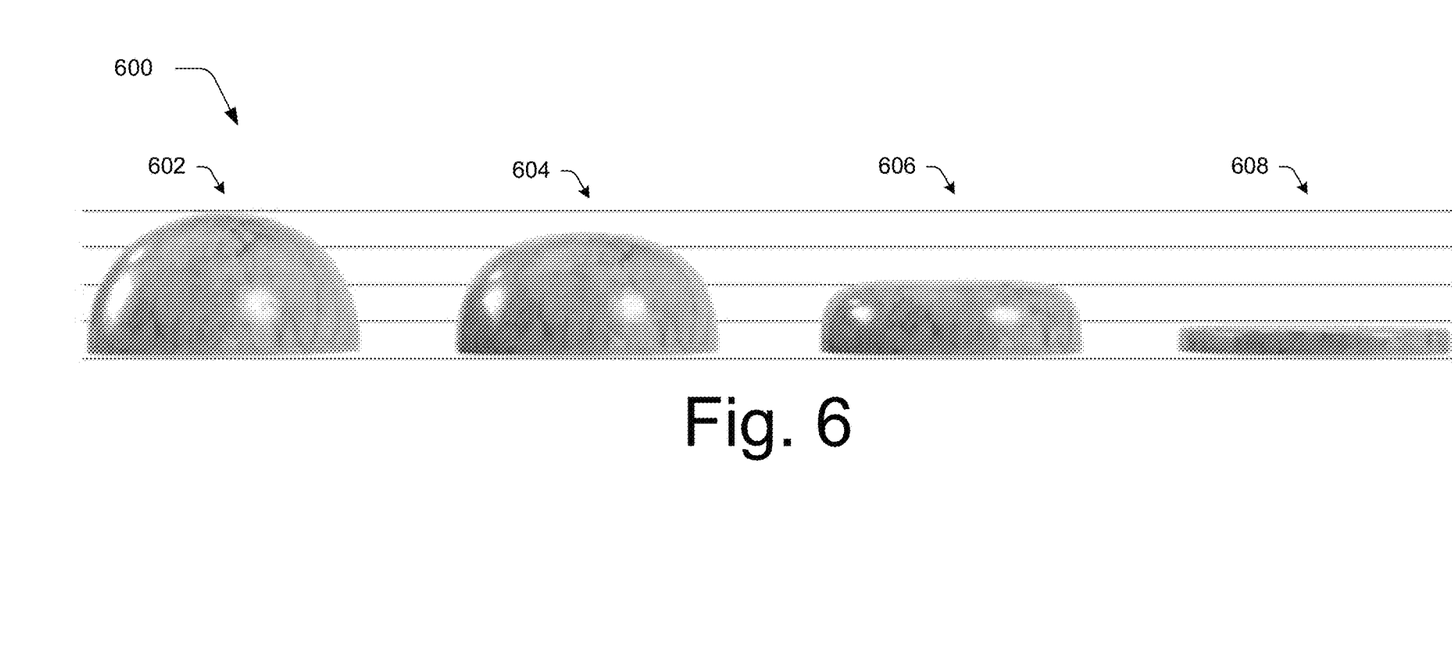
FIG. 6 depicts an example implementation showing the effect of different values of an inflation parameter on generation of a three-dimensional surface of an inflated digital object.

FIG. 6 depicts an example implementation 600 showing an effect of different values of the inflation parameter 206 on generation of a three-dimensional surface of the inflated digital object 120. A first example 602 illustrates an effect of the inflation parameter 206 of "α=1." A second example 604 illustrates an effect of the inflation parameter 206 of "α=0.75," in a third example 606 the inflation parameter 206 is set at "α=0.5," and in a fourth example 608 the inflation parameter 206 is set at "α=0.25."

The inflated digital object 120 is then output for display in the user interface 110 (block 410) by rendering performed by the rendering module 222. In this way, the geometry inflation system 116 overcomes challenges of conventional techniques and improves operation of the computing device 102 to support real time output as a user input is received, e.g., for changes made to the two-dimensional digital object 118, the inflation parameter 206, and so on.

Figure 7:
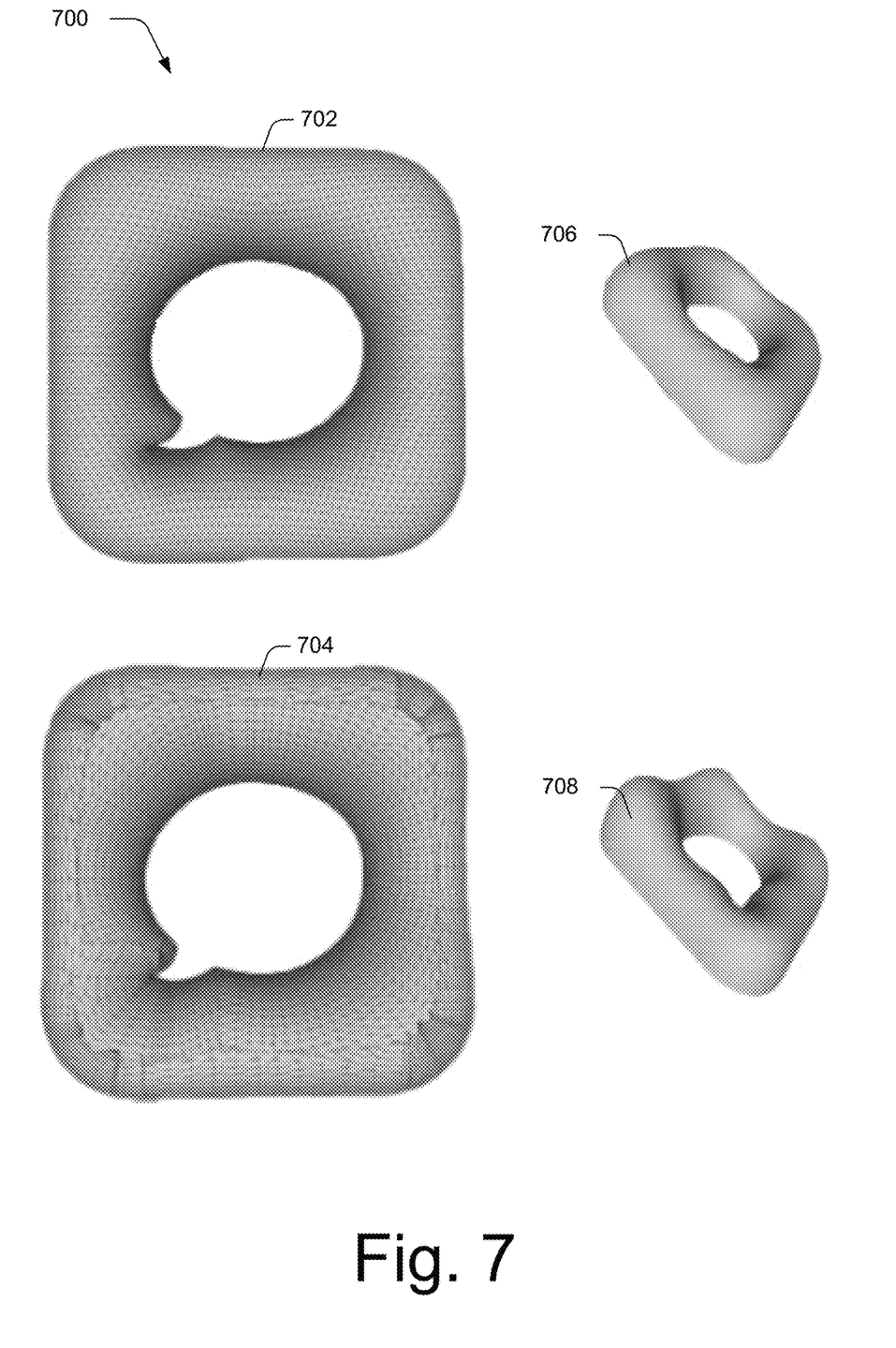
FIG. 7 depicts an example implementation comparing a mesh generated using uniform triangulation followed by biharmonic smoothing compared with a mesh generated using conventional skeleton-based techniques.
Figure 8:
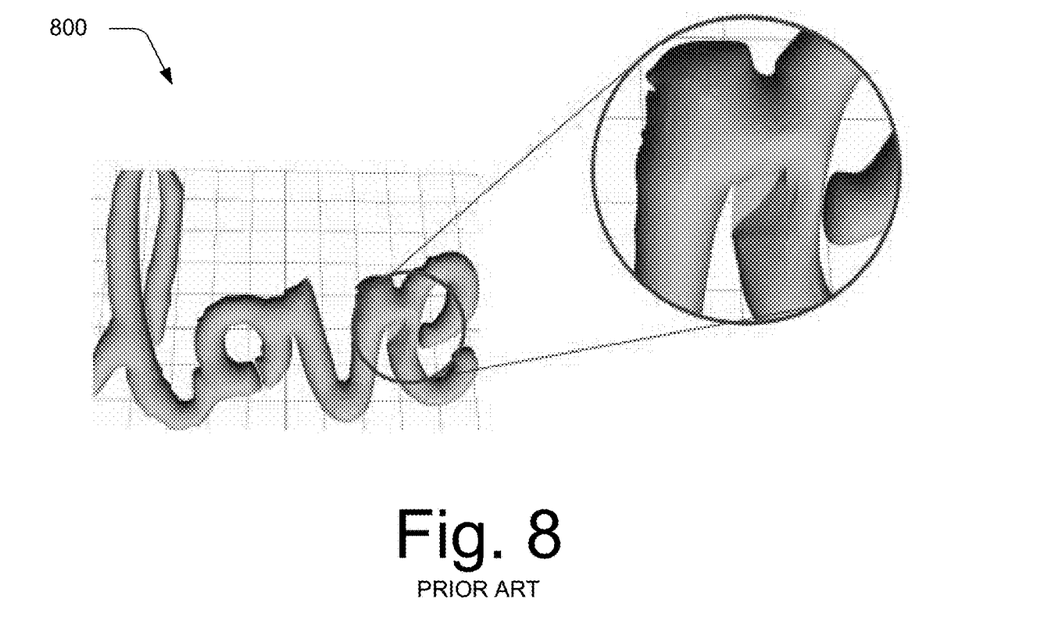
FIG. 8 depicts a prior art example showing artifacts along an edge encountered as a result of skeleton-based three-dimensional surface generation.
Figure 9:
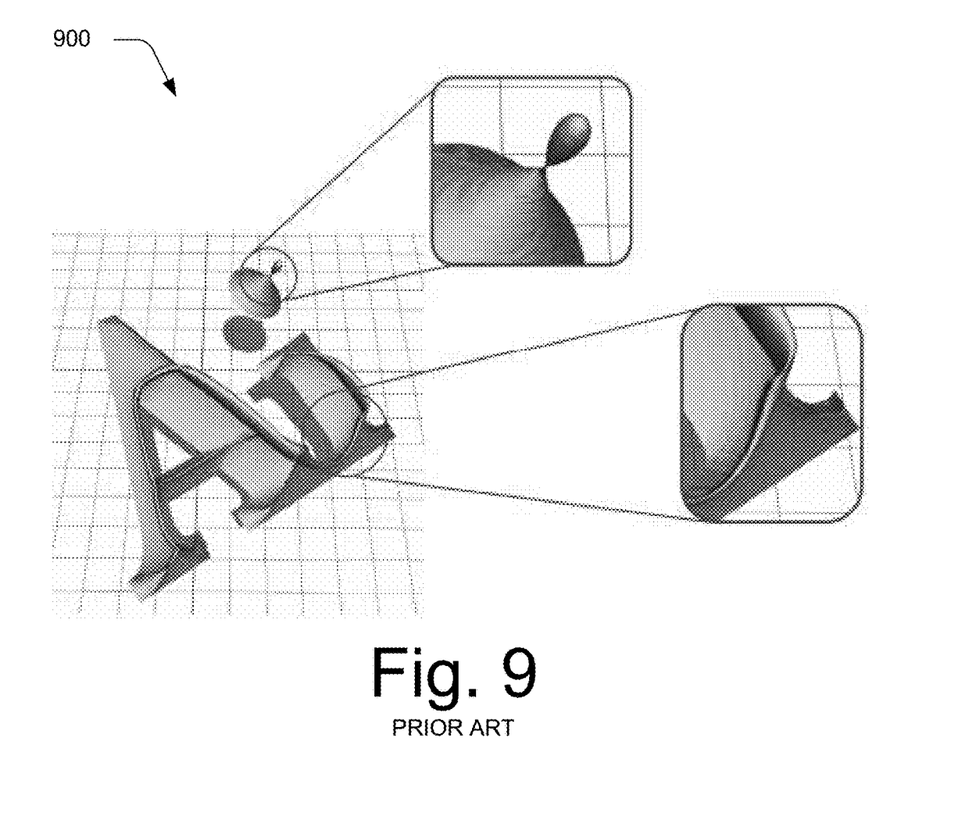
FIG. 9 depicts a prior art example showing self-intersection artifacts encountered as a result of skeleton-based three-dimensional surface generation.

As illustrated in an example implementation 700 of FIG. 7, vertices and faces of a mesh 702 computed using uniform triangulation followed by biharmonic smoothing forms a smooth continuous topology when compared with a mesh 704 generated using conventional skeleton-based techniques. A side view 706 of the mesh 702 further exhibits the smooth surface when compared with a side view 708 of the mesh 704 having a non-uniform surface exhibiting crests and troughs. In another example, FIG. 8 depicts a prior art example 800 showing artifacts along an edge encountered as a result of skeleton-based three-dimensional surface generation. FIG. 9 depicts a prior art example 900 showing self-intersection artifacts encountered as a result of skeleton-based three-dimensional surface generation.

Example System and Device

Figure 10:
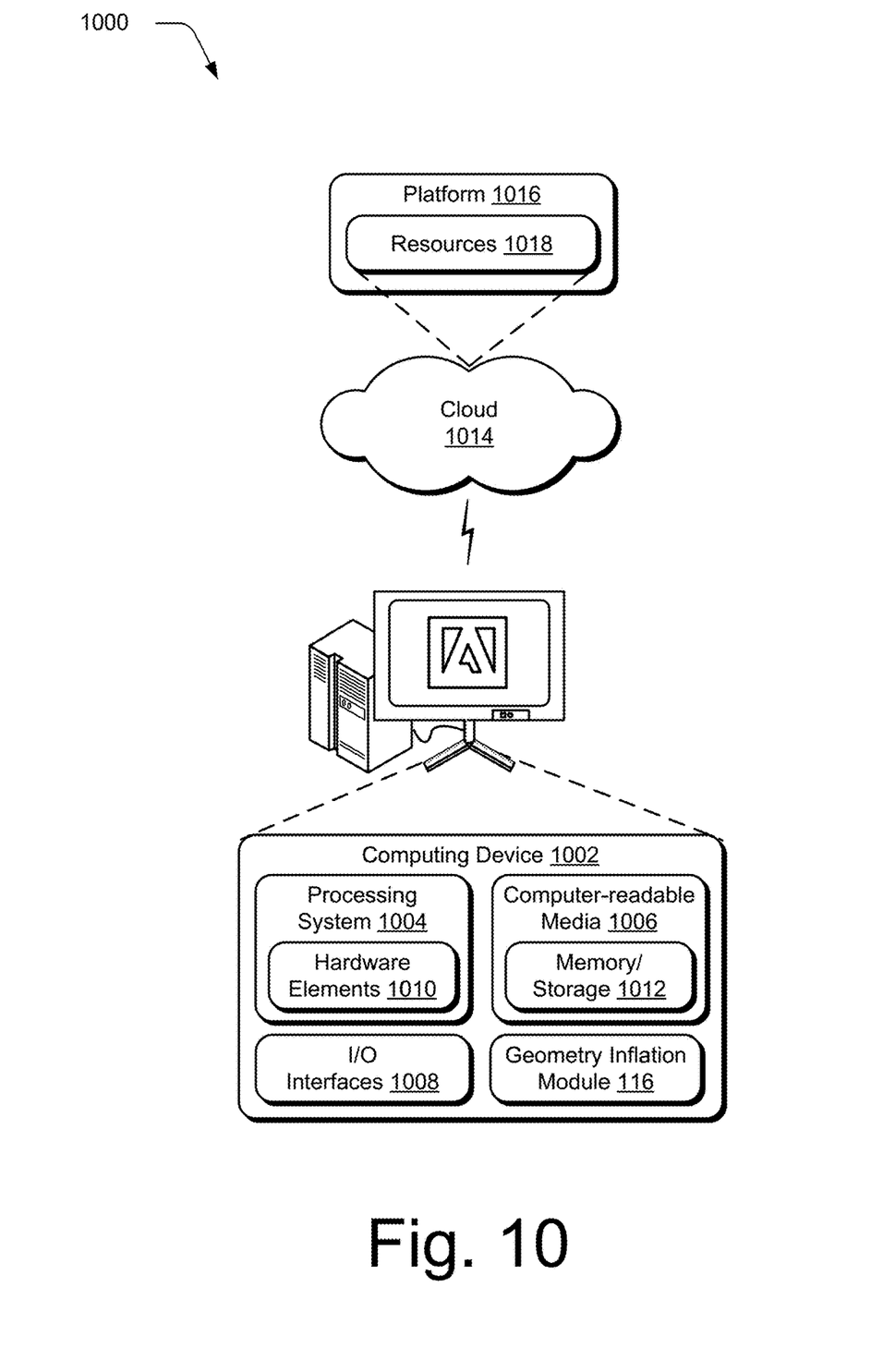
FIG. 10 illustrates an example system including various components of an example device that can be implemented as any type of computing device as described and/or utilize with reference to FIGS. 1-7 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the geometry inflation system 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   defining, by the computing device, an outer boundary for a two-dimensional digital object displayed in a user interface;
   generating, by the computing device, a mesh using the outer boundary, the mesh defined using a plurality of points and the generating of the mesh employs a discretization technique such that density of the mesh is increased based on nearness to the outer boundary;
   generating, by the computing device, an inflated digital object by determining heights for the plurality of points of the mesh based on an inflation parameter; and
   outputting, by the computing device, the inflated digital object for displaying in the user interface.

2. The method as described in claim 1, wherein the digital object is defined mathematically or is a vector object.

3. The method as described in claim 1, wherein the defining the outer boundary includes forming a plurality of polylines by sampling segments of the digital object.

4. The method as described in claim 3, wherein:
   the forming of the plurality of polylines by sampling the segments is based on length or curvature of Bezier segment in an input spline that defines the outer boundary; and
   the generating the mesh uses triangulation based on the plurality of polylines.

5. The method as described in claim 1, wherein the generating of the mesh employs a discretization technique such that discretization of the mesh increases as curvature of a surface of the mesh increases.

6. The method as described in claim 1, wherein the generating of the mesh employs a triangulation technique followed by biharmonic smoothing.

7. The method as described in claim 1, wherein the generating of the inflated digital object employs at least one rule indicating the heights for the plurality of points define a surface having continuous curvature ($C^2$) smoothness.

8. The method as described in claim 1, wherein the generating of the inflated digital object employs at least one rule indicating the heights for the plurality of points at the outer boundary are zero.

9. The method as described in claim 1, wherein the generating of the inflated digital object employs at least one rule indicating a surface of the inflated digital object is orthogonal at the outer boundary in relation to a plane defined by the two-dimensional digital object.

10. The method as described in claim 1, further comprising receiving a user input via the user interface that specifies the inflation parameter.

11. The method as described in claim 10, wherein the generating the inflated digital object and the outputting of the inflated digital object is performed in real time as the user input is received.

12. A system comprising:
a processing system; and
a non-transitory computer-readable storage medium storing instructions that, responsive to execution by the processing system, causes the processing system to perform operations including:
receiving an input identifying a two-dimensional digital object of a digital image and an inflation parameter;
generating an inflated digital object having a surface defined in three dimensions using a plurality of points included as part of a mesh and a plurality of heights defined, respectively, for the plurality of points, the generating employing at least one rule that indicates the plurality of heights for the plurality of points at an outer boundary of the inflated digital object are zero; and
rendering the inflated digital object in a user interface.

13. The system as described in claim 12, wherein the at least one rule indicates the plurality of heights for the plurality of points define a surface having continuous curvature ($C^2$) smoothness.

14. The system as described in claim 12, wherein the at least one rule indicates a surface of the inflated digital object is orthogonal at an outer boundary of the digital object in relation to a plane defined by the digital object.

15. The system as described in claim 12, the operations further comprising:
defining an outer boundary for the two-dimensional digital object; and
generating a mesh using the outer boundary, the mesh defined using the plurality of points.

16. The system as described in claim 12, wherein the generating includes generating the mesh using a discretization technique such that density of the mesh is increased based on nearness to an outer boundary of the two-dimensional digital object.

17. One or more computer-readable storage media that is non-transitory and storing instructions that are executable by a processing system to perform operations comprising:
defining an outer boundary for a two-dimensional digital object in a digital image;
generating a mesh using the outer boundary, the mesh defined using a plurality of points;
generating an inflated digital object by determining heights for the plurality of points of the mesh based on an inflation parameter, the generating employing at least one rule indicating a surface of the inflated digital object is orthogonal at the outer boundary in relation to a plane defined by the digital image; and
rendering the inflated digital object for displaying in a user interface.

18. The one or more computer-readable storage media as described in claim 17, wherein the generating the inflated digital object further employs a rule indicating the heights for the plurality of points define a surface that is $C^2$ smooth or the heights for the plurality of points at the outer boundary are zero.

19. The one or more computer-readable storage media as described in claim 17, wherein the generating the inflated digital object employs a uniform triangulation technique followed by biharmonic smoothing.

20. The one or more computer-readable storage media as described in claim 17, wherein the generating the mesh uses a discretization technique such that density of the mesh is increased based on nearness to the outer boundary.

* * * * *